United States Patent [19]

Doherty

[11] 4,199,851
[45] Apr. 29, 1980

[54] APPARATUS FOR APPLYING PLASTIC SLEEVES TO GLASS BOTTLES

[75] Inventor: Thomas E. Doherty, Setauket, N.Y.

[73] Assignee: Owens-Illinois, Inc., Toledo, Ohio

[21] Appl. No.: 961,339

[22] Filed: Nov. 16, 1978

[51] Int. Cl.² .............................................. B23P 19/02
[52] U.S. Cl. ..................................... 29/235; 156/218; 156/294
[58] Field of Search ................... 29/235; 53/128, 290, 53/291, 292; 156/218, 294

[56] References Cited

U.S. PATENT DOCUMENTS

| | | | |
|---|---|---|---|
| 3,551,258 | 12/1970 | Galvanoni et al. | 53/291 |
| 3,611,536 | 10/1971 | Guenther et al. | 29/235 |
| 3,624,892 | 12/1971 | Monteiro | 29/235 |
| 3,802,942 | 4/1974 | Amberg et al. | 156/218 |

FOREIGN PATENT DOCUMENTS 615995  3/1961  Canada ..................................... 53/292

*Primary Examiner*—James L. Jones, Jr.
*Attorney, Agent, or Firm*—D. T. Innis; Myron E. Click; David H. Wilson

[57] ABSTRACT

The present invention relates to an apparatus for applying a plastic sleeve to a rigid base article, such as a glass bottle. A blank of plastic is wrapped around a mandrel and seamed to form a plastic sleeve. The bottle to which the sleeve is to be applied is preheated and longitudinally aligned over the mandrel. A pressurized fluid is introduced between the plastic sleeve and the mandrel to form a fluid cushion upon which the plastic sleeve can slide without binding or wrinkling. As the pressurized fluid is introduced, a stripper sleeve is actuated to engage the lower edge of the plastic sleeve and block the passage of the pressurized fluid therefrom. Thus, the plastic sleeve is inflated slightly about the mandrel. Then the stripper sleeve is moved upwardly to telescope the plastic sleeve onto the aligned bottle. A gasket is secured to the upper base of the mandrel, upon which the bottle rests during the transfer operation. The gasket tends to direct the flow of the pressurized fluid toward the sleeve and away from the gap between the mandrel and the inwardly curving lower end of the bottle. Also, additional pressurized fluid is introduced through apertures formed in the upper base of the mandrel to prevent the plastic sleeve from collapsing. When the stripper sleeve is fully extended and the plastic sleeve covers the bottle, the heat of the bottle causes the plastic sleeve to shrink slightly such that it is held in position relative to the bottle until it is subjected to a final thermoconstrictive operation.

9 Claims, 6 Drawing Figures

APPARATUS FOR APPLYING PLASTIC SLEEVES TO GLASS BOTTLES

BACKGROUND OF THE INVENTION

1. Field of the Invention

This invention relates in general to an apparatus for applying a thin plastic sleeve to a rigid base article, such as a glass bottle.

2. Description of the Prior Art

The use of a fluid medium such as air to provide a surface of low friction is well known. For example, U.S. Pat. No. 3,370,517, issued to T. Vichos, discloses an apparatus in which a perforated tube supplies a cushion of air to reduce the frictional effects of a sharp turn in the path of a moving sheet of flexible plastic. In passing the sheet over the cushioned turn, the friction and drag on the plastic are substantially reduced. Another use of air is disclosed in U.S. Pat. No. 2,782,459, issued to L. J. Moncrieff. A plastic tube is chemically softened and hand drawn over a lubricated expansion in a mandrel. Pressure is exerted on the interior of the tube by a gaseous medium supplied through outlets in the expansion. The pressure tends to overcome any sticking of the tube to the mandrel during the transfer.

SUMMARY OF THE INVENTION

The present invention relates to an improved apparatus for applying a thin plastic covering, such as polystyrene, to a rigid base article, such as glass bottle. The apparatus avoids prior problems encountered with thin plastic coverings, chiefly wrinkling or binding in the transfer from a forming means to the rigid base article, by employing a cushion of pressurized fluid upon which the plastic sleeve can slide easily.

Plastic material is cut into proper lengths and wrapped around a mandrel. The plastic is sealed at the overlapping edges to form a plastic sleeve around the mandrel. The mandrel has a means for supplying a pressurized fluid, such as compressed air, formed in its exterior surface and upper base periphery. A gasket for controlling the flow of the compressed air is secured to the upper base of the mandrel. A preheated bottle is longitudinally aligned above the mandrel and placed in contact with the gasket secured to the upper base of the mandrel. Compressed air is introduced between the mandrel and the plastic sleeve. A stripper sleeve is moved upwardly such that it engages the lower edge of the plastic sleeve to block the flow of the pressurized air and a thin cushion of air inflates the plastic sleeve slightly about the mandrel. The stripper sleeve continues to move upwardly pushing the plastic sleeve telescopically onto the bottle. The compressed air introduced through the upper base of the mandrel and the gasket secured thereupon for controlling the combined flow of the air prevent the plastic sleeve from collapsing in the gap between the mandrel and the bottle. The stripper sleeve pushes the plastic sleeve onto the bottle. The retained heat in the bottle shrinks the plastic slightly such that, when the stripper sleeve is retracted, the plastic sleeve remains in position relative to the bottle until it is subjected to a final thermoconstrictive operation.

It is, therefore, an object of this invention to reduce wrinkling and binding in the application of a thin plastic sleeve to a rigid base article.

It is also an object of this invention to increase the efficiency and reduce the cost of making glass bottles having a plastic sleeve covering.

It is a further object of this invention to operate compatibly with existing machinery designed to produce such plastic covered articles.

DETAILED DESCRIPTION OF THE INVENTION

Figure 1:
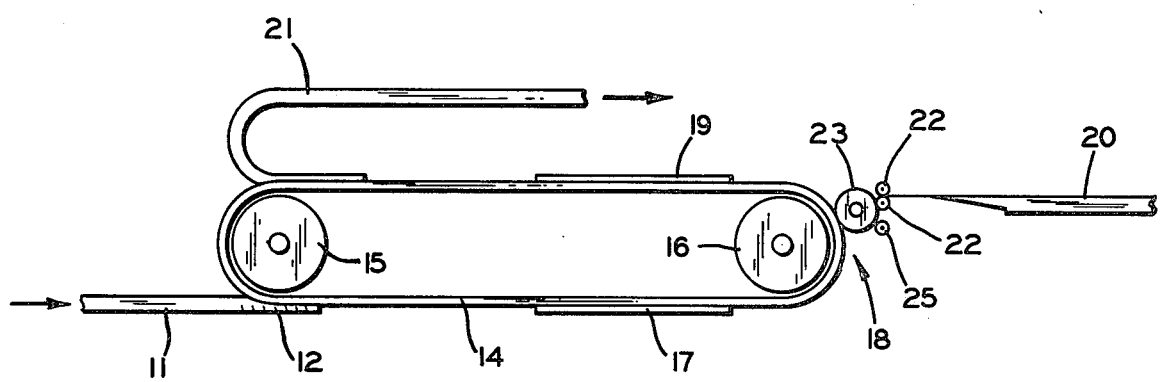
FIG. 1 is a plan view of an apparatus for forming and applying a plastic sleeve to a glass bottle in accordance with the present invention.

The present invention is an improvement in an apparatus for forming and applying a plastic sleeve to a rigid base article such as a glass bottle. The individual machine component movements can be controlled by any suitable means. For example, U.S. Pat. No. 3,802,942 discloses a machine for producing plastic covered glass containers and a detailed description of the machine components and their operation will not be presented here. Such a machine, including the present invention, is shown schematically in plan view in FIGS. 1 and 2. Bottles are fed into the machine on a conveyor 11. An infeed timing worm 12 spaces the bottles in accordance with the center spacing on overhead bottle chucks (not shown). The chucks travel on a driven endless carriage 14 along a path defined by a pair of machine sprockets 15 and 16, through a preheater oven 17 if necessary, past a plastic sleeve assembly station 18, and then into and through a tunnel oven 19 for the thermoconstrictive treatment of the bottle and its plastic covering. The chuck then deposits the bottle on an unloading conveyor 21.

Figure 2:
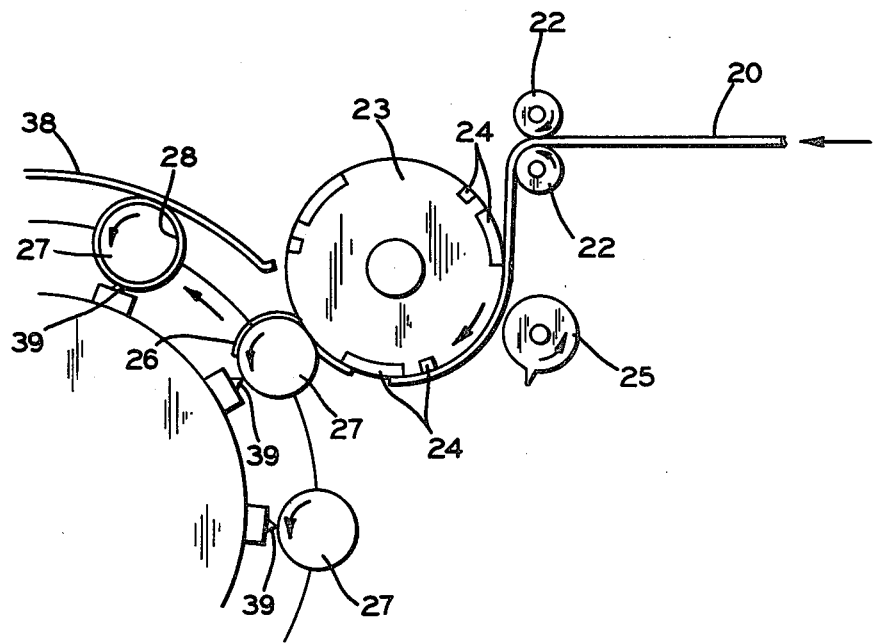
FIG. 2 is an enlarged plan view illustrating the bottle wrapping portion of the apparatus of FIG. 1.

FIG. 2 schematically illustrates the plastic sleeve forming station 18. A web 20 of prepared plastic is guided between a pair of feed rollers 22 onto a rotating feed drum 23. A plurality of small ports 24 in the feed drum 23 are connected to a vacuum source (not shown) to create a pressure differential with the external atmosphere to hold the plastic web 20 on the feed drum 23. A rotating knife blade 25 cuts the web 20 into desired length blanks 26. Each plastic blank 26 is wound on a separate rotating mandrel 27 and seamed at an end-to-end overlap region to form a plastic sleeve 28. A plurality of the mandrels 27 move synchronously with the bottles on the carriage 14 along parallel paths sharing a common longitudinal axis. The plastic sleeve 28 is stripped from the mandrel 27 and telescoped over the bottle. The retained heat in the preheated bottle shrinks the sleeve to maintain it in position for the subsequent thermoconstrictive treatment.

Figure 3:
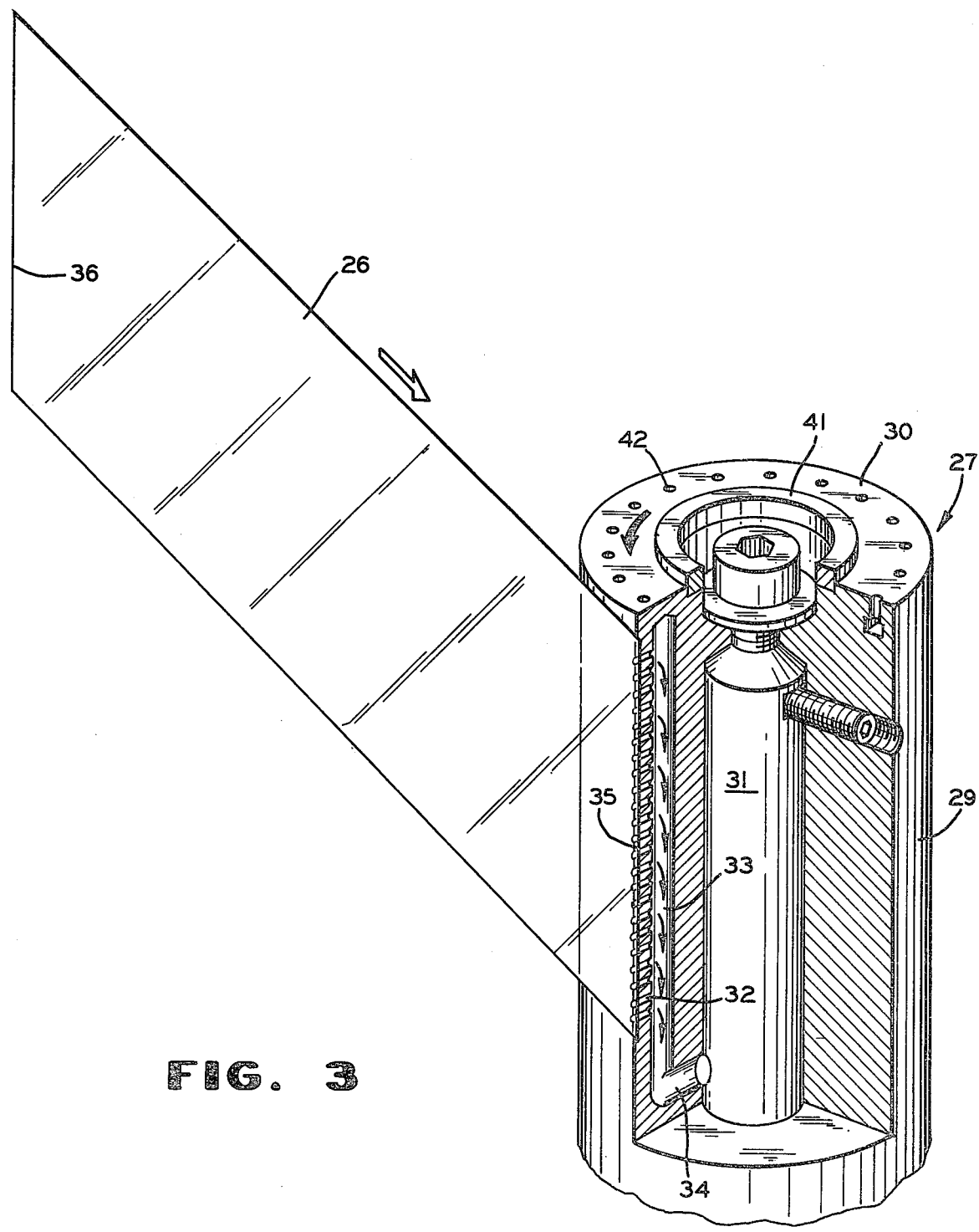
FIG. 3 is a perspective view of the plastic blank being wrapped around the mandrel in the apparatus of FIG. 2.

The present invention concerns an improvement in the plastic sleeve forming station 18. FIG. 3 illustrates one of the mandrels 27 having an exterior surface 29 and an upper base 30. The mandrel 27 is mounted on a vertical shaft 31 for rotating the mandrel 27 about its own longitudinal axis. A plurality of ports 32 are formed in the exterior surface 29 of the mandrel 27 in a vertical row. Each port 32 is connected to a vacuum source (not shown) through an internal chamber 33 formed in the mandrel 27. The chamber 33 is connected through a radial port 34 to a vertical passage (not shown) in the shaft 31. Although only one row of ports 32 is illustrated, two or more rows can be used.

As the plastic blank 26 is fed off of the feed drum 23, a leading edge 35 is held to the mandrel 27 by the pressure differential between the external atmospheric pressure and the vacuum at the ports 32. The mandrel 27 is now at the beginning of the wind operation and rotates in a counterclockwise direction as shown by the arrow. The plastic blank 26 is wrapped about the mandrel 27 such that a trailing edge 36 of the blank 26 overlaps the leading edge 35. Throughout the wind operation, the vacuum applied to the ports 32 is maintained. Also, to insure a tight and even wrap, the plastic blank 26 is held against the mandrel 27 by a stationary winding plate 38 (illustrated in FIG. 2) which is suitably supported on the frame of the machine.

Figure 4:
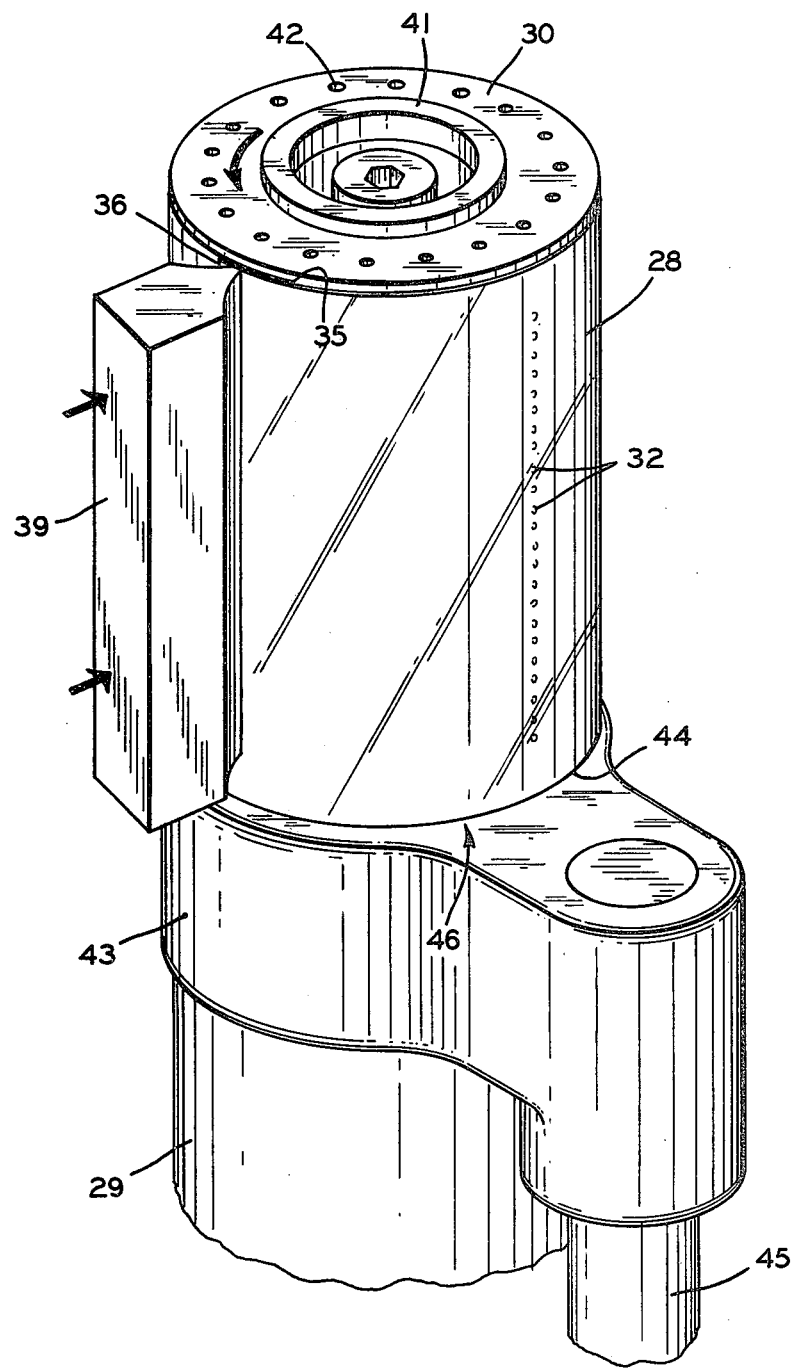
FIG. 4 is a perspective view of the heat sealing bar and the mandrel of FIG. 2.

The rotation of the mandrel 27 advances the leading edge 35 of each plastic blank 26 to a point opposite a heat sealing bar 39 positioned adjacent to each mandrel 27 such that the trailing edge 36 of the blank overlaps the leading edge 35, as illustrated in FIG. 4. When the winding of the plastic blank 26 is completed, the heat sealing bar 39 is moved against the overlapping edges of the blank 26. The heat and the pressure generated by heat sealing bar 39 seal the edges together to form the plastic sleeve 28. The bar 39 is then retracted in preparation for the next operation.

Figure 5:
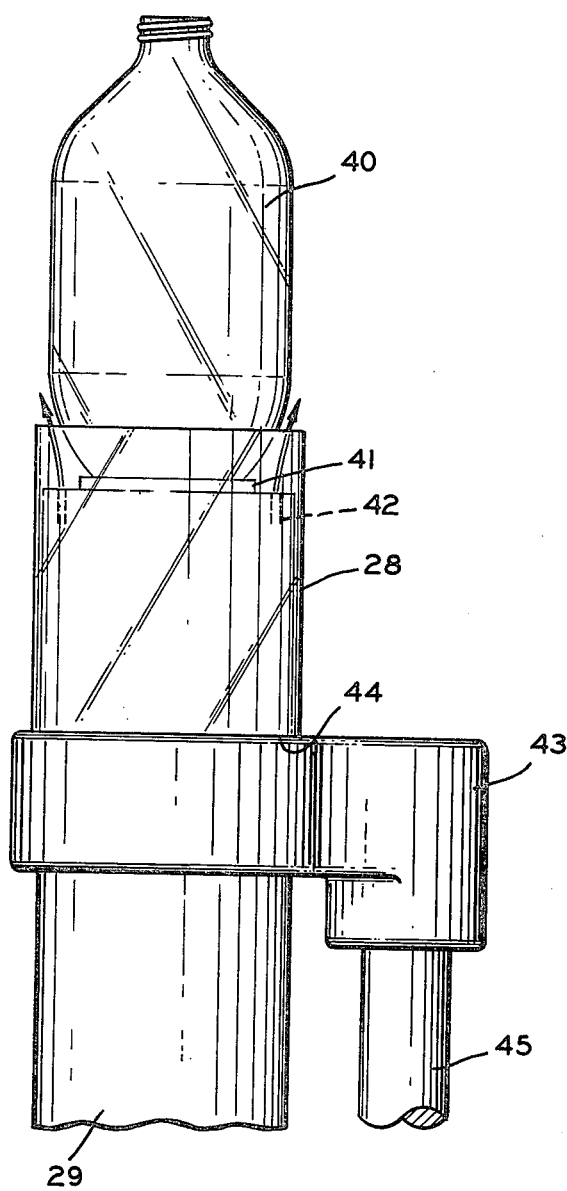
FIG. 5 is a side elevational view of a bottle longitudinally aligned with the mandrel with the plastic sleeve being telescoped onto the bottle in accordance with the present invention.

Following the winding and sealing operations, the plastic sleeve 28 is ready to be applied to the bottle. Referring to FIG. 5, a preheated bottle 40 is moved into position above the mandrel 27 and the plastic sleeve 28. The bottle 40 is lowered onto a gasket 41 which is attached to the upper base 30 of the mandrel 27. The mandrel and the bottle are synchronously moved such that they are longitudinally aligned and travel at zero velocity relative to each other. The source of vacuum connected to the ports 32 is disconnected in preparation for an ejection operation.

The ejection operation begins when a means for supplying a pressurized fluid is employed to form a cushion between the plastic sleeve 28 and the mandrel 27. In the preferred embodiment, pressurized air is supplied through the ports 32 formed in the mandrel 27. Pressurized air is also supplied to a plurality of ports 42 formed in the upper base 30 of the mandrel 27. The pressurized air forms a cushion between the inner surface of the sleeve 28 and the outer surface of the mandrel 27 upon which the plastic sleeve 28 can slide.

Figure 6:
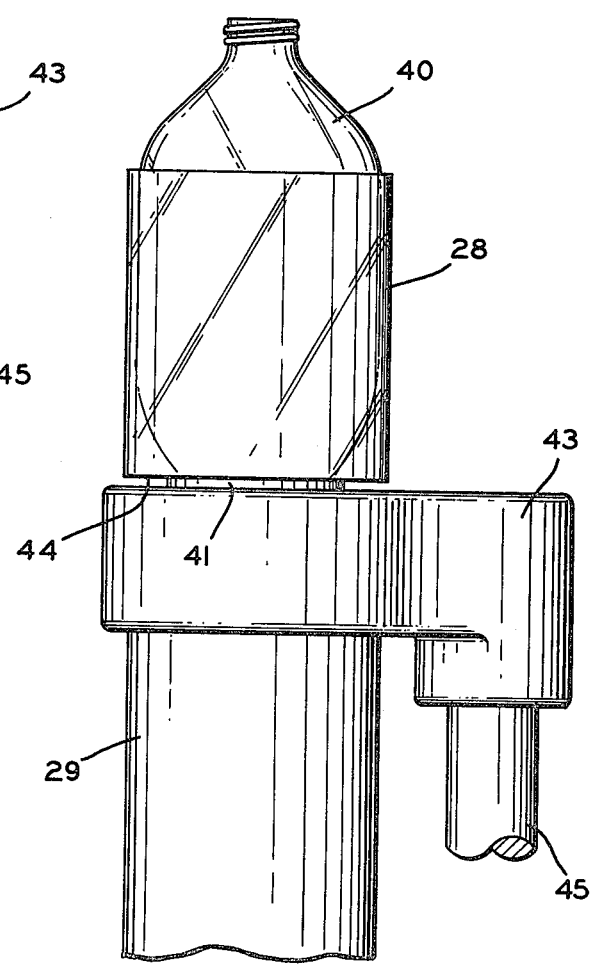
FIG. 6 is a side elevational view of the bottle and the plastic sleeve of FIG. 5 in registry.

A stripper sleeve 43 is formed about the exterior surface 29 of the mandrel 27 below the plastic sleeve 28 for engaging a lower edge portion 44 thereof. A means for moving the stripper sleeve 43, such as an actuator rod 45, is attached to the stripper sleeve. The actuator rod 45 is extended to raise the stripper sleeve 43 upwardly so that the stripper sleeve 43 contacts the lower edge portion 44 of the plastic sleeve 28 and blocks the passage of air therefrom. Thus, the plastic sleeve 28 is inflated slightly about the mandrel 27 by a cushion of air. The stripper sleeve 43 continues to be raised upwardly, moving the plastic sleeve 28 telescopically over the bottle 40 as illustrated in FIG. 6.

As the plastic sleeve 28 is being telescoped over the bottle 40, the upper edge of the sleeve has a tendency to collapse in a gap 46 been the upper base 30 of the mandrel 27 and the inwardly curved lower end of the bottle 40. It has been found to be desirable to provide a means for controlling the flow of the pressurized fluid from the mandrel 27 to the bottle 40. The gasket 41 secured to the upper base 30 of the mandrel 27 and upon which the bottle 40 rests during the telescoping process can serve as this controlling means. The gasket 41 partially fills the gap 46 and directs the combined flow of pressurized air from the exterior surface ports 32 and the upper base ports 42 upwardly around the exterior surface of the bottle 40, thus preventing the plastic sleeve 28 from collapsing because of a loss of the pressurized cushion. When the stripper sleeve 43 is fully extended, the plastic sleeve 28 is in registry with the bottle 40. The source of the pressurized air is then disconnected and the stripper sleeve 43 is retracted downwardly by the actuator rod 45 to reset in its original position in preparation for a next telescoping operation. The heat retained in the bottle 40 from the preheat operation preshrinks the plastic sleeve 28 enough to hold it in position about the bottle 40 until it is subjected to the final the rmoconstrictive process.

In summary, the present invention concerns an apparatus for forming plastic sleeves and attaching them to rigid base articles. The apparatus includes a mandrel, means for forming the plastic sleeve about the mandrel, means for positioning the rigid base article adjacent the mandrel at one end of the plastic sleeve and means for telescoping the plastic sleeve onto the rigid base article. The telescoping means includes means for moving the plastic sleeve from the mandrel and telescoping the plastic sleeve over the rigid base article, a source of pressured fluid, a first means connected to the pressurized fluid source for forming a cushion of pressurized fluid between the exterior of the mandrel and the interior surface of the plastic sleeve while the plastic sleeve is being moved, a second means connected to the pressurized fluid source and positioned at the end of the mandrel adjacent the one end of the plastic sleeve for forming a cushion of pressurized fluid between the exterior surface of the rigid base article and the interior surface of the plastic sleeve while the plastic sleeve is being telescoped over the rigid base article, and means for sealing the end surface of the mandrel to the rigid base article for directing the pressurized fluid from the second means along the exterior side surface of the rigid base article.

The first means can include a plurality of apertures formed in the exterior surface of the mandrel in fluid communication with the pressurized fluid source and the second means can include a plurality of apertures formed in the end surface of the mandrel adjacent the rigid base article and in fluid communication with the pressurized fluid source. The sealing means can be a gasket.

I claim:

1. In an apparatus for forming plastic sleeves and attaching them to rigid base articles, the apparatus including a mandrel, means for forming the plastic sleeve about the mandrel, means for positioning the rigid base article adjacent the mandrel at one end of the plastic sleeve, and means for telescoping the plastic sleeve onto the rigid base article, telescoping means comprising:

means for moving the plastic sleeve from the mandrel and telescoping the plastic sleeve over the rigid base article;

a source of pressurized fluid;

first means connected to said pressurized fluid source for forming a cushion of pressurized fluid between the exterior surface of the mandrel and the interior surface of the plastic sleeve while the plastic sleeve is being moved; and second means connected to said pressurized fluid source for forming a cushion of pressurized fluid between the exterior surface of the rigid base article and the interior surface of the plastic sleeve while the plastic sleeve is being telescoped over the rigid base article.

2. An apparatus according to claim 1 wherein said first means includes a plurality of apertures formed in the exterior surface of the mandrel in fluid communication with said pressurized fluid source.

3. An apparatus according to claim 1 wherein said second means includes a plurality of apertures formed in the end surface of the mandrel adjacent the rigid base article and in fluid communication with said pressurized fluid source.

4. An apparatus according to claim 1 including means for sealing the end surface of the mandrel to the rigid base article for directing the pressurized fluid from said second means along the exterior side surface of the rigid base article.

5. An apparatus according to claim 4 wherein said sealing means is a gasket.

6. In an apparatus for forming plastic sleeves and attaching them to rigid base articles, the apparatus including a mandrel, means for forming the plastic sleeve about the mandrel, means for positioning the rigid base article adjacent the mandrel at one end of the plastic sleeve, and means for telescoping the plastic sleeve onto the rigid base article, the telescoping means comprising:

means for moving the plastic sleeve from the mandrel and telescoping the plastic sleeve over the rigid base article;

a source of pressurized fluid;

first means connected to said pressurized fluid source for forming a cushion of pressurized fluid between the exterior surface of the mandrel and the interior surface of the plastic sleeve while the plastic sleeve is being moved;

second means connected to said pressurized fluid source and positioned at the end of the mandrel adjacent the one end of the plastic sleeve for forming a cushion of pressurized fluid between the exterior surface of the rigid base article and the interior surface of the plastic sleeve while the plastic sleeve is being telescoped over the rigid base article; and means for sealing the end surface of the mandrel to the rigid base article for directing the pressurized fluid from said second means along the exterior side surface of the rigid base article.

7. An apparatus according to claim 6 wherein said first means includes a plurality of apertures formed in the exterior surface of the mandrel in fluid communication with said pressurized fluid source.

8. An apparatus according to claim 7 wherein said second means includes a plurality of apertures formed in the end surface of the mandrel adjacent the rigid base article and in fluid communication with said pressurized fluid source.

9. An apparatus according to claim 8 wherein said sealing means is a gasket.

* * * * *